United States Patent

Shiga et al.

[11] Patent Number: 5,112,167
[45] Date of Patent: May 12, 1992

[54] HIGH SPEED BURNISHING DRILL

[75] Inventors: Kiyotaka Shiga; Akio Fukui; Akiomi Ryu; Katsumi Okuno, all of Toyota, Japan

[73] Assignee: Fuji Seiko Corporation, Toyota, Japan

[21] Appl. No.: 566,477

[22] PCT Filed: Aug. 4, 1989

[86] PCT No.: PCT/JP89/00804
§ 371 Date: Aug. 14, 1990
§ 102(e) Date: Aug. 14, 1990

[87] PCT Pub. No.: WO90/14189
PCT Pub. Date: Nov. 29, 1990

[51] Int. Cl.⁵ ............................................. B23B 51/02
[52] U.S. Cl. .................................. 408/211; 408/224; 408/229
[58] Field of Search .............. 408/211, 223, 224, 227, 408/229, 230

[56] References Cited

U.S. PATENT DOCUMENTS

| 3,977,807 | 8/1976 | Siddall | 408/203 X |
| 4,605,347 | 8/1986 | Jodock et al. | 408/224 |
| 4,944,640 | 7/1990 | Suzuki et al. | 408/224 X |

FOREIGN PATENT DOCUMENTS

| 57-112827 | 7/1982 | Japan |  |
| 60-24511 | 7/1985 | Japan |  |
| 61-28657 | 8/1986 | Japan |  |
| 278711 | 11/1988 | Japan | 408/229 |
| 1238905 | 6/1986 | U.S.S.R. | 408/230 |

Primary Examiner—Steven C. Bishop
Attorney, Agent, or Firm—Cushman, Darby & Cushman

[57] ABSTRACT

A high speed burnishing drill having drilling edges and reaming edges provided at the forward end of a cylindrical drilling body. The drilling edges are inclined diametrically from the center of the forward end to the axially rearward direction, while the outermost peripheral wall of the drilling edges are on a reduced-diameter portion of the maximum external diameter of the drill body. The reaming edges extend from the plane intersecting the drilling edges radially from a position inward of the outermost peripheral of the drilling edges, outwards, so as to incline axially in the forward direction with a second cutting angle. A reduced diameter portion extends axially backward from the outermost peripheral wall of the drilling edges. An enlarged-diameter guide face extends axially from a slope behind the corresponding drilling edge in the rotational direction, and the forwardmost end of the enlarged guide face is located axially behind the corresponding reaming edge.

3 Claims, 7 Drawing Sheets

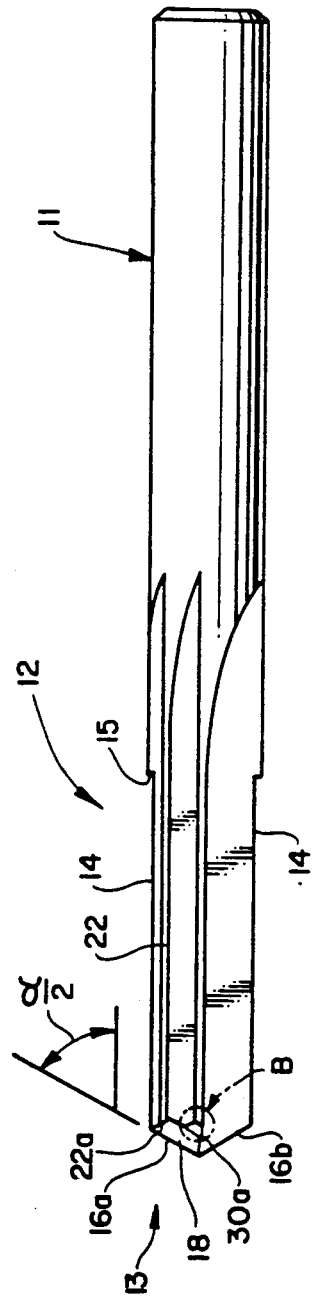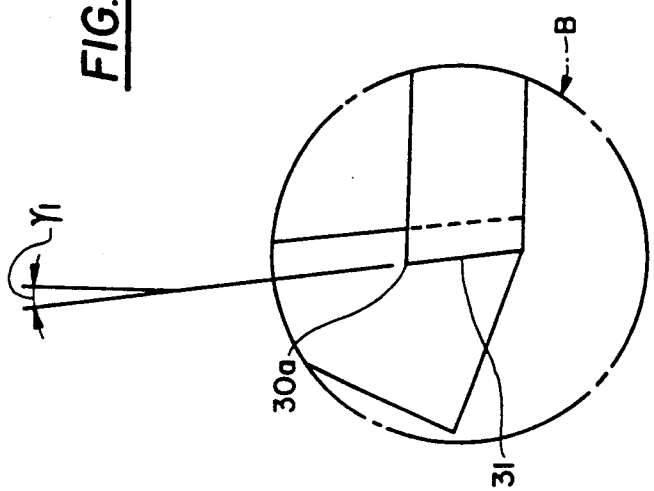

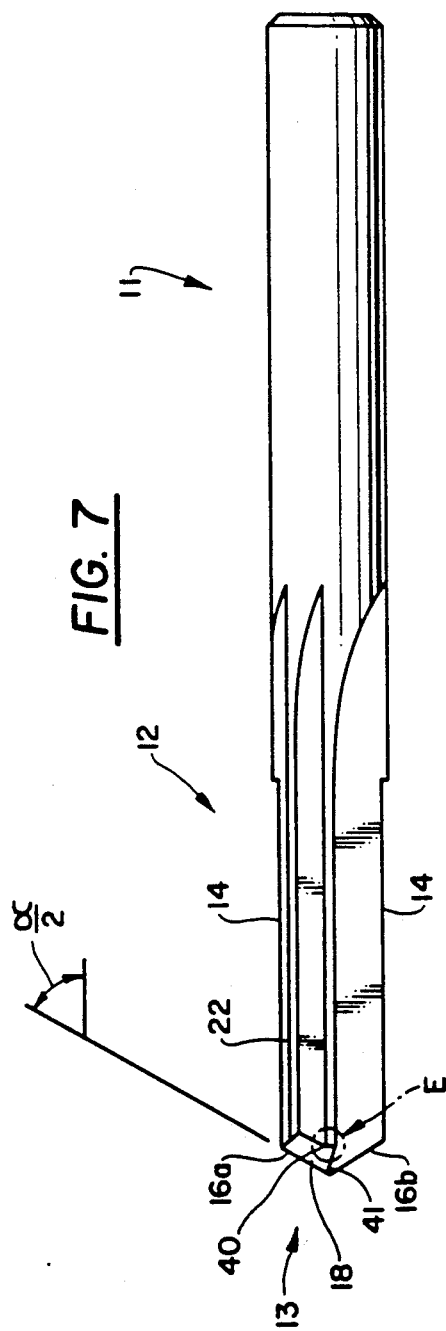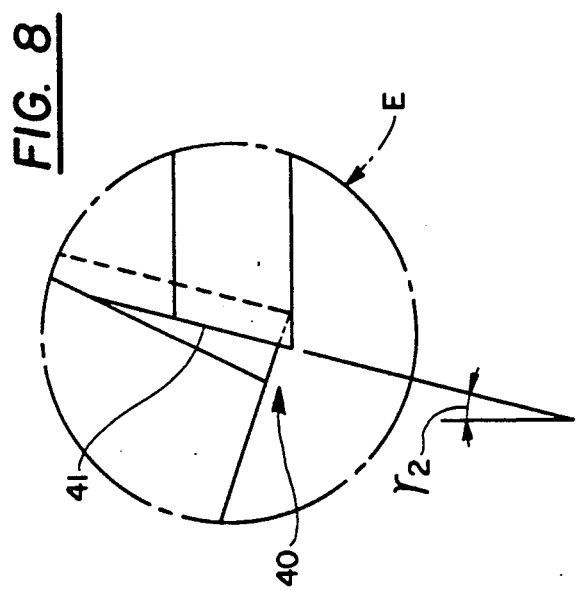

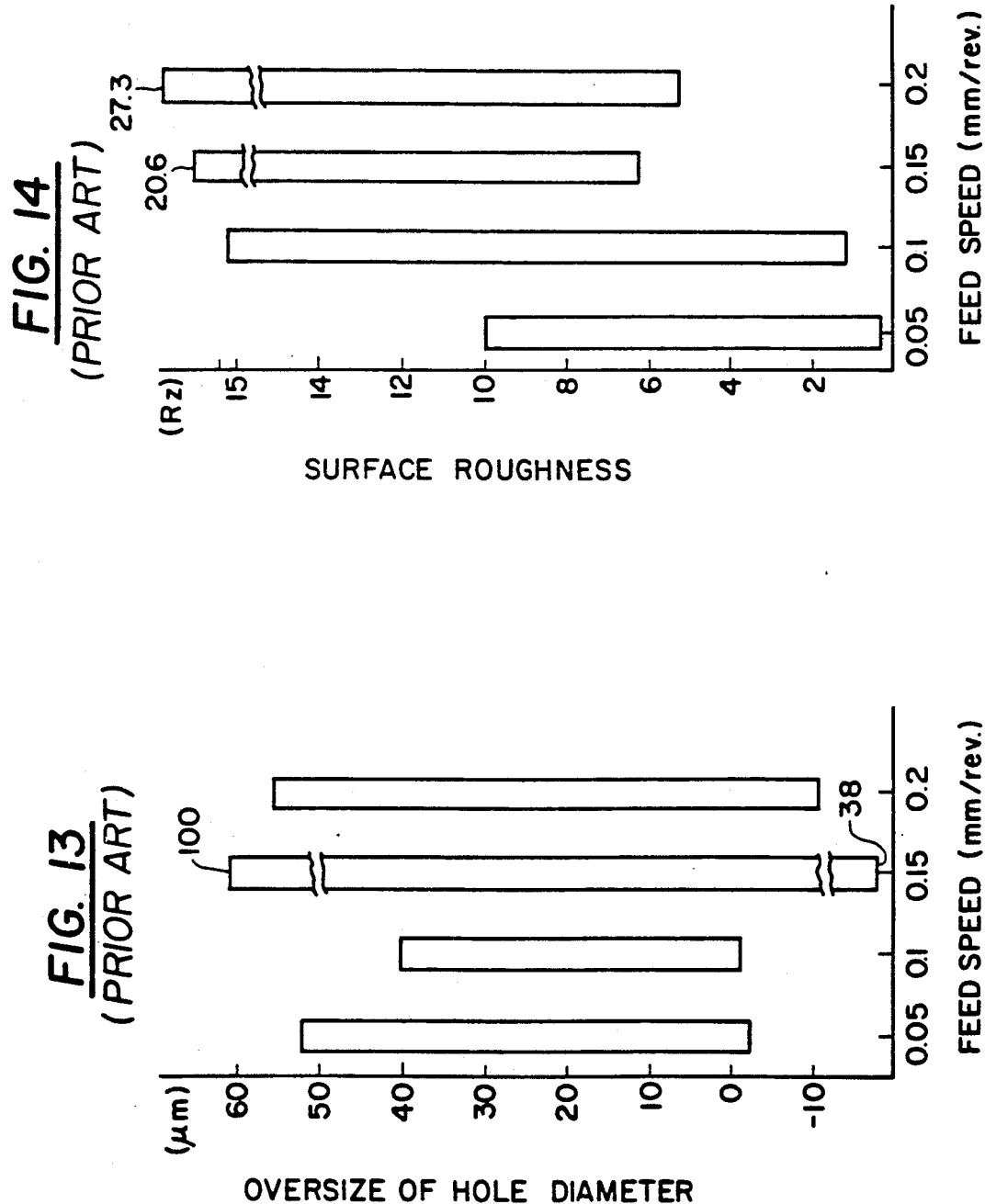

5,112,167

HIGH SPEED BURNISHING DRILL

TECHNICAL FIELD

The present invention relates to a reamer section drill and more particularly to an improved high-speed burnishing drill.

BACKGROUND ART

Various types of drilling tools are known which are adapted to ream a hole of a desired diameter while cutting the wall of the hole. Such drilling tools are a single-purposed, exclusive and/or automated tool which can be increased in cutting efficiency and used to provide high-quality and uniform products.

Japanese Utility Model Application laid open under Kokai publication No. 62-65107 discloses a reamer section drill including two drilling edges and four reaming edges, all these edges being arranged in the same circle.

FIGS. 11 and 12 in the accompanying drawings show another burnishing drill. Such a burnishing drill comprises a cylindrical drill body 2 connected with a shank 1, the drill body 2 includes cutting edges 5, formed therein, at the tip 3 thereof, and opposed to each other diametrically about the longitudinal axis of the drill body 2. Each of the cutting edges 5 includes a slant face 6 extending therefrom rearwardly in the direction of rotation (indicated by arrow A in FIG. 12) and a guide face 7 axially extending from the edge of the slant face 6. The drill body 2 further includes a longitudinally extending relief surface 8 formed therein between each of the cutting edges 5 and the corresponding guide face 7 at the outer wall of the drill body 2 and a longitudinally extending relief groove 9 formed in the drill body 2.

This drill does not have good centering and stabilizing properties since the initial bite cannot be properly made. As a result, the drilled hole made is excessively reamed and its inner wall is rough. This drill often generates a built-up edge.

SUMMARY OF THE INVENTION

It is therefore an object of the present invention to provide an improved high-speed feed-type burnishing drill which will not ream the drilled hole excessively and can provide a drilled hole with a smoother inner wall.

Another object of the present invention is to provide an improved high-speed feed-type burnishing drill which is superior in the fusion-resistance, thereby improving the centering and stabilizing properties.

Another object of the present invention is to provide a burnishing drill which is available for reuse by polishing the tip of the drill body.

To this end, the present invention provides a high-speed burnishing drill comprising a shank and a cylindrical drill body connected at one end with the shank.

The opposite end of the drill body has a pair of drilling edges opposed to each other diametrically about the longitudinal axis of the drill body from the center of the forward end of the drill body. Also, the drilling edges incline in an axially rearward direction with a first cutting angle, the outermost margins of the drilling edges being on a reduced-diameter portion having its diameter smaller than the maximum external diameter of the drill body. A pair of reaming edges is formed on the plane intersecting the other plane including the drilling edges about the longitudinal axis of the drill body and these reaming edges extend radially outward from a position inward of the outermost peripheral wall of the drilling edges. The reaming edges also incline axially in the forward direction with a second cutting angle. A reduced-diameter portion of the drill body extends axially backward from the outermost peripheral wall of the drilling edges. An enlarged-diameter guide face is formed on the drill body to extend from a slope formed at a position behind the corresponding drilling edge in the rotational direction toward the shank. The axially forwardmost end of the enlarged-diameter guide face is located at a position axially behind the corresponding reaming edge.

The high speed burnishing drill of the present invention may include the reaming edge connected with a slant face which is inclined axially backward as the slant face extends backward in the rotational direction.

The high speed burnishing drill of the present invention may include the reaming edge connected with a slant face which is inclined axially forward as the slant face extends backward in the rotational direction.

The burnishing drill of the present invention has the reaming edges which are located in the forward end of the drill body at the outermost periphery thereof on a plane intersecting the other plane including the drilling edges. Thus, the burnishing drill separates the chip discharge channels of the reaming edges from the chip discharge channels of the drilling edges. The drill and reamer device of the present invention also provides a high rake reamer angle to improve the fusion-resistance, resulting in a great increase of stability on cutting.

On drilling, an original hole is drilled by the drilling edges formed on the reduced-diameter portion of the drill body at its tip end. The drilled hole is then smoothened by the reaming edges formed on the drill body concentrically relative to the drilling edges.

At this time, the enlarged guide faces extending axially on the drill body slidably engage with the inner wall of the hole being machined so that the drill will be rotated and stabilized about the central axis of the rotation to enhance stability on cutting.

Since the reduced-diameter drill portion extends backwardly from the outermost periphery of the drilling edges along the longitudinal axis to the shank, the drill and reamer device can be remachined for reuse by polishing the tip of the drill body.

BRIEF DESCRIPTION OF DRAWINGS

FIG. 1 is a side elevation view of a first embodiment of a burnishing drill according to the present invention;

FIG. 2 is an enlarged fragmentary view of the part of the drill which is shown enclosed by the circle B in FIG. 1;

FIG. 7 is a side elevation view similar to FIG. 1, showing a second embodiment of a burnishing drill according to the present invention;

FIG. 8 is an enlarged view of the part of the burnishing drill which is enclosed by the circle E in FIG. 7;

FIG. 13 is a graphical illustration similar to FIG. 9, illustrating the same correlation for the prior art burnishing drill; and FIG. 14 is a graphical illustration similar to FIG. 10, illustrating the same correlation for the prior art burnishing drill.

DETAILED DESCRIPTION

Figure 3:
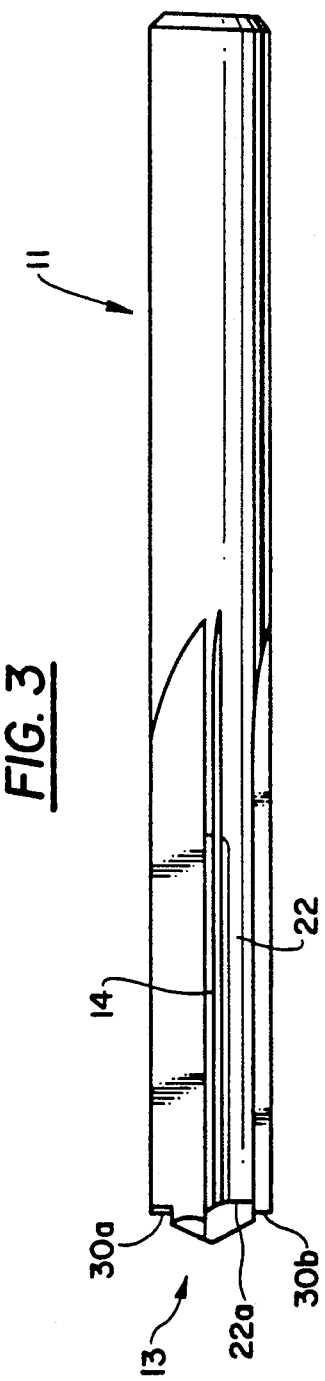
FIG. 3 is an another side elevation view of the burnishing drill shown in FIG. 1, with the burnishing drill being rotated 90 degrees about the central axis thereof.

Some embodiments of the burnishing drill according to the present invention are explained hereinunder with reference to the accompanying drawings.

In FIGS. 1 through 6, the first embodiment of a burnishing drill according to the present invention is shown.

The burnishing drill comprises a shank 11 and a cylindrical drill body 12 integrally connected with the shank 11. The drill body 12 is made of hard metal (tungsten-carbon alloy). A reduced-diameter portion 14 of the drill body 12 extends axially from the forward end 13 to the step portion 15 of the drill body 12. The reduced-diameter portion 14 has a diameter smaller than the maximum external diameter of the drill body 12. Therefore, when the drill is worn so as to be unusable, the tip of the drill can be re-machined for reuse.

A pair of straight drilling edges 16a and 16b extend axially from the forward center of the reduced-diameter portion 14 most remote from the shank 11. Each of the straight drilling edges 16 a and 16b is inclined axially and backwardly about the center of the forward drill portion with a first cutting angle $\alpha$ as best seen from FIG. 1. The outermost peripheral margins of the drilling edges 16a and 16b are connected with the forwardmost end of the reduced-diameter portion 14.

The drill body 12 comprises chip-releasing sections 21 which are formed at a forward position relative to the direction of rotation (indicated by arrow A in FIG. 4) in the corresponding drilling edges 16a and 16b. Each of the chip-releasing sections 21 is connected with a chip-releasing pocket 19 formed on the drilling body 12 at a position located backwardly of the corresponding chip-releasing section 21 in the axial direction. The drill body 12 further comprises slopes 18 formed thereon at a backward position relative to the direction of rotation and inclined axially and backwardly as the slopes 18 extend in the radial direction.

An circular arcuate enlarged-diameter guide face 22 extends axially from the outermost peripheral margin of the slope 18 and has its axially backward end connecting with the shank 11. During drilling, the enlarged-diameter guide faces 22 will be slidably engaged with and guided by the inner wall of the drilled hole such that the drill can be moved properly along the longitudinal axis of the drilled hole without deviation.

Figure 4:
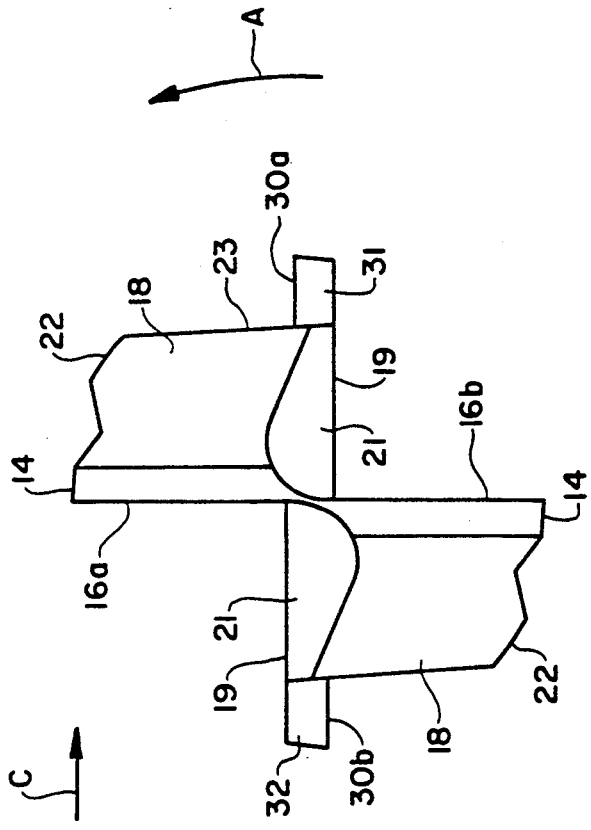
FIG. 4 is an enlarged front end elevation view of the burnishing drill shown in FIG. 1

The outermost periphery of the drill body 12 is formed with a pair of reaming edges 30a and 30b extending therefrom outward in the diametrical direction substantially perpendicular to the plane including the drilling edges 16a and 16b, as seen from FIG. 4. The reaming edges 30a and 30b are inclined axially forward as their edges extend outward from a position on a circle having a radius smaller than the maximum radial distance of the corresponding drilling edges, as shown in FIG. 3. The forward inclined reaming edges 30a and 30b are positioned at a axial forward location of the axial forwardmost end 22a of the enlarged-diameter guide face 22, as seen from FIG. 3. Thus, the reaming can be effected by the reaming edges 30a and 30b immediately after the drilling has been performed by the drilling edges 16a and 16b. Further, an axial extending relief groove 23 is perforated on the drill body 12 at a forward position relative to the rotating direction of the reaming edges 30a and 30b. The relief grooves 23 are connected with the corresponding slope 18.

Figure 6:
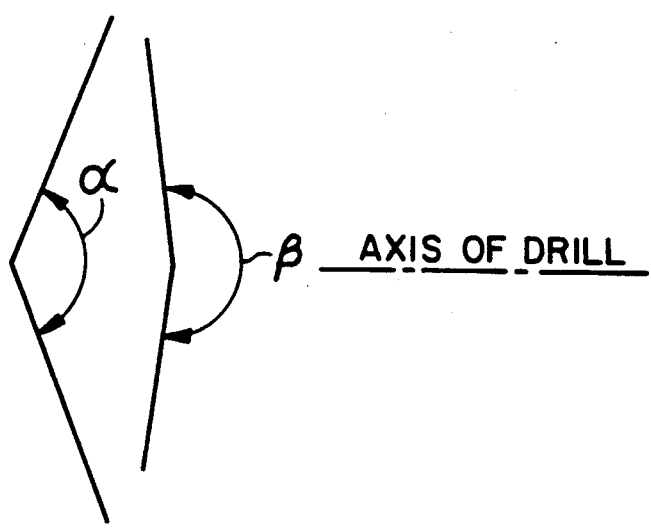
FIG. 6 is an enlarged view illustrating the correlation between the cutting angle $\alpha$ of the drilling edges and the cutting angle $\beta$ of the reaming edges.

As shown in FIG. 6, each of the reaming edges 30a and 30b has a second predetermined cutting angle $\beta$:

$$190° \leq \beta \leq 240°.$$

If the second cutting angle $\beta$ is smaller than 190°, it will be found that the surface roughness of the drilled hole increases. If the second cutting angle $\beta$ is larger than 240°, the outermost margins of the reaming edges 30a and 30b will be excessively sharpened, resulting in increased risk of breakdown.

Figure 5:
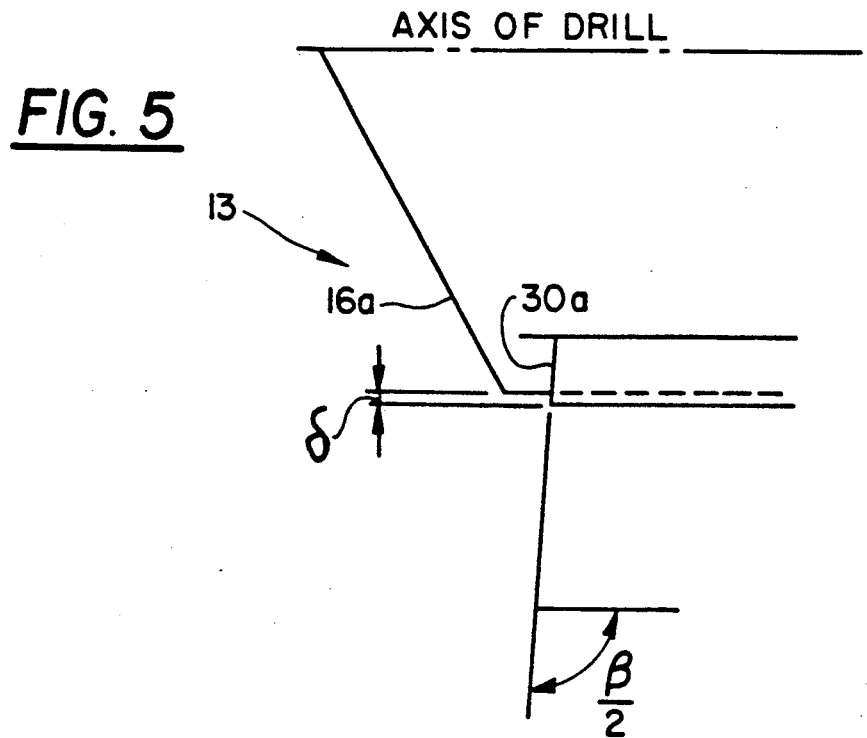
FIG. 5 is an enlarged fragmentary side elevation view of the primary overlapped portions of the burnishing drill as viewed in the directions of arrows C and D in FIG. 4.

As shown in FIG. 5, the reaming edge 30a extends radially outward from a circle on outermost margin of the drilling edge 16a by a distance $\delta$ and the reaming edge 30a is also inclined axially forward as it extends radially to form an inversely directed edge. In such a manner, the inner wall of the hole drilled by the drilling edges 16a and 16b can be smoothened by the reaming edges 30a and 30b. Moreover, the reaming edges 30a and 30b can have a larger good initial bite in the drilled hole.

As best seen from FIG. 2, the reaming edge 30a or 30b is connected with a slant face (relief face) 31 or 32 which is inclined axially backward as the slant face 31 or 32 extends backward in the rotational direction. The inclined angle $\gamma_1$ of the slant faces 31 or 32 is, in the "positive" direction, defined by:

$$\Theta_1 \leq 5°.$$

Thus, the strength of the reaming edges can be provided to the burnishing drill.

During operation, the burnishing drill of the present invention is rotated as indicated by arrow A in FIG. 4. A workpiece is first drilled by the drilling edges 16a and 16b. The drilled hole made is then reamed by the reaming edges 30a and 30b to provide a smoothened inner wall in the machined hole. The rotational center of the drilling edges 16a and 16b coincides with that of the reaming edges 30a and 30b, and yet the enlarged-diameter guide faces 22 are slidably engaged with the inner wall of the drilled hole. As a result, the drill can move axially straight while rotating, to enhance the stability on cutting.

In FIGS. 7 and 8, the second embodiment of a burnishing drill according to the present invention is shown. The basic structure of the second embodiment is similar to that of the first embodiment. Therefore, only parts different from those of the above first embodiment will be described with respect to the second embodiment.

As shown in FIG. 8, a reaming edge 40 includes an edge face 41 which is inclined axially forward as the edge face 41 extends backward in the direction of rotation. The inner wall of workpiece is reamed by the edge face 41. The inclined angle $\beta_2$ of the edge face 41 is, in the "negative" direction, defined by:

$$\gamma_2 \leq 10°.$$

If the inclined angle $\gamma_2$ of the edge face 41 is larger than 10°, the strength of the reaming edge 41 is excessively reduced. Further, the edge face 41 is inclined axially forward as it extends radially, similar to the reaming edges 30a and 30b in the first embodiment.

Figure 11:
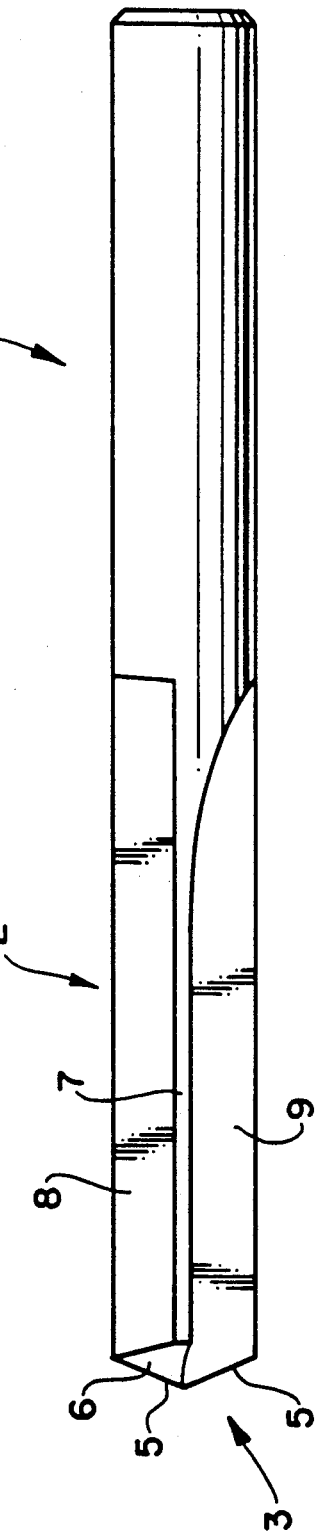
FIG. 11 is a side elevation view of a burnishing drill according to the prior art.
Figure 12:
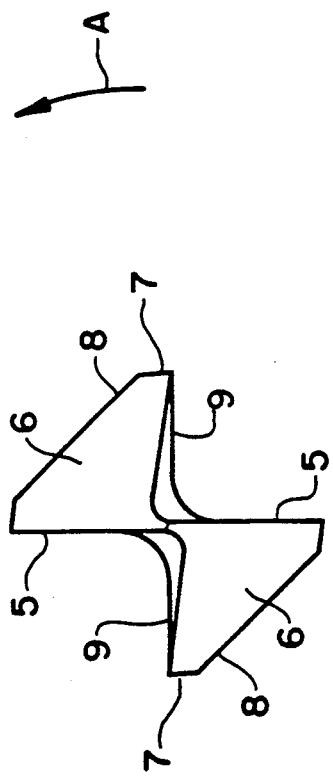
FIG. 12 is an enlarged front end elevation view of the prior art burnishing drill shown in FIG. 11

Results obtained from comparative tests between the first embodiment of the present invention and a burnishing drill according to the prior art will be described below. The prior art drill used herein is shown in FIGS. 11 and 12.

Figure 9:
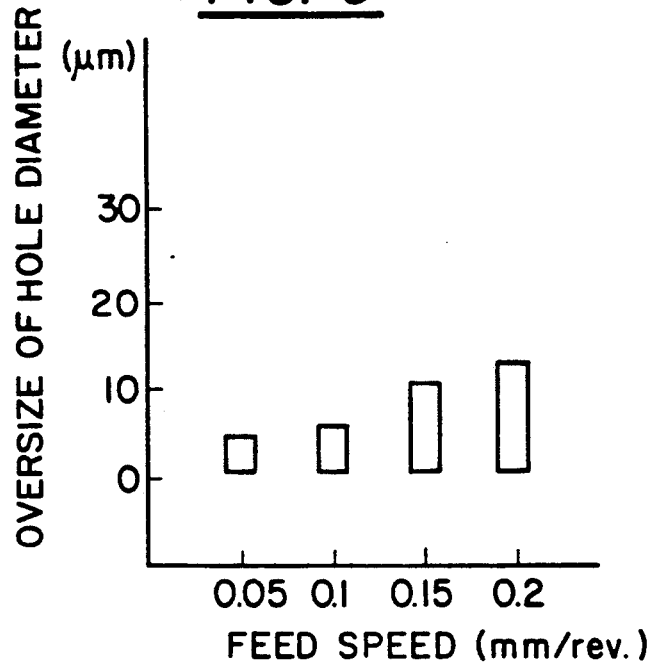
FIG. 9 is a graphical form illustration of the correlation between the feed speed and the amount of oversize of the hole diameter in the first embodiment of the present invention.
Figure 10:
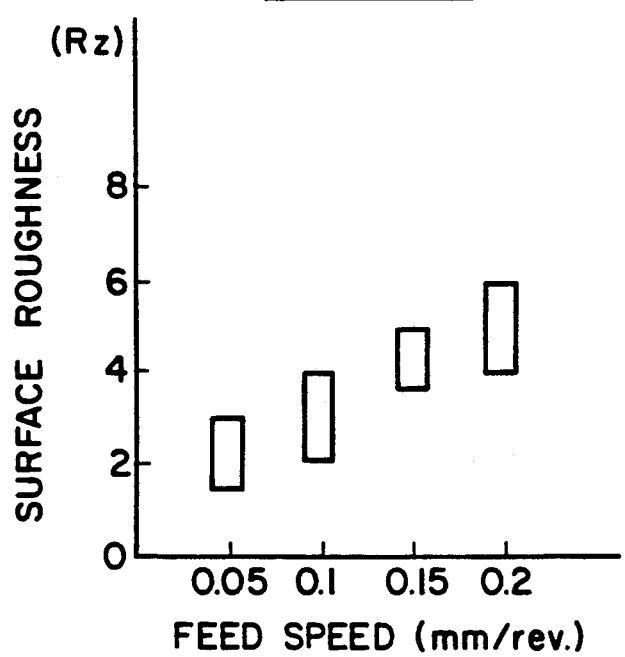
FIG. 10 is a graphical illustration of the correlation between the feed speed and the surface roughness of the machined hole wall in the first embodiment of the present invention.

FIG. 9 illustrates the correlation between the feed speed and the over-size of the hole diameter in the hole drilled and reamed by the first embodiment of the drill according to the present invention, while FIG. 10 shows the correlation between the feed speed and the surface roughness of the inner wall of the drilled and reamed hole. FIGS. 13 and 14 illustrate results corresponding to those of FIGS. 9 and 10 respectively in the prior art.

In FIGS. 9 and 13, the value "0" relating to the over-size of the hole diameter indicates that there is no difference between the drilled and reamed hole diameter and the standard hole diameter. As will be apparent from FIG. 13, the drilled and reamed hole diameter according to the prior art is substantially larger than the standard hole diameter, irrespective of the feed speed. In contrast, as will be apparent from FIG. 9, the drilled and reamed hole diameter according to the first embodiment of the present invention is substantially smaller than the standard hole diameter, substantially irrespective of the feed speed. The oversize of the hole diameter according to the first embodiment of the present invention is much larger than that of the prior art.

Upon comparison of FIG. 10 with FIG. 14, it will be understood that the surface roughness of the inner hole wall according to the prior art is relatively large in dispersion. Further, the surface roughness is increased as the feed speed is increased. In contrast, the surface roughness according to the present invention is much smaller than that according to the prior art. Even if the feed speed is increased, the dispersion and the maximum value of the surface roughness are suppressed very small in the present invention.

As is apparent from the above description, in the high speed burnishing drill according to the present invention, a drilling edge is located in the reduced diameter portion of one end of a drill body, while a reaming edge is located in the larger diameter portion rearwardly behind the rotating direction of the drilling edge. As a result, the inner wall is drilled by the drilling edge and is reamed so as to become more smoothened by the reaming edges. It becomes possible to make a coaxial hole by means of the drilling edge and the reaming edge so as to perforate a hole having the over-size of the hole diameter substantially equal to or larger than the oversize of the reamer and with minimum surface roughness.

Since the drilling edges and the reaming edges are used for the drilling and reaming operations through one step, the working can be effected for a shortened time period, with adequate accuracy.

Furthermore, since the enlarged-diameter guide faces formed axially on the drill body are slidably engaged on the inner wall of the drilled and reamed hole, the drilling and reaming can be performed properly without deviation, to enhance the stability during cutting and to reduce the over-size reamed, the surface roughness and the dispersion thereof.

Since the reduced-diameter portion of the drill body is axially extended, the drilling edges and the reaming edges can be re-ground several times for reuse. Thus, the service life of the burnishing drill can be lengthened.

In addition, since the distance between the drilling edges and the reaming edges is fixed so that these elements are axially close to each other, the burnishing drill can make a hole to be formed along a straight axis with a minimum axial distance between the drilling wall and the reaming wall. Even though the feed speed is increased within a predetermined range of speed, the oversize of hole diameter and the surface roughness can be reduced.

What is claimed is:

1. A high-speed burnishing drill comprising:
   a shank;
   an externally axially straight-grooved, generally cylindrical drill body connected at one end thereof with said shank as a coaxial extension therefrom, said drill body also having an axially opposite, forward end;
   a pair of drilling edges located at said opposite end of the drill body, said drilling edges being opposed to each other diametrically about the longitudinal axis of the drill body from the center of the forward end of the drill body, and inclining axially in a rearward direction with a first cutting angle, said drilling edges having respective outermost margins thereof disposed on a reduced-diameter portion of said drill body, said reduced diameter portion having an external diameter which is smaller than the maximum external diameter of the drill body;
   a pair of reaming edges formed on a first plane intersecting a second plane including said drilling edges about the longitudinal axis of said drill body, extending radially outward from a position inward of an outermost peripheral wall of said drilling edges, and inclining axially in the forward direction with a second cutting angle;
   said reduced-diameter portion extending axially backward from the outermost peripheral wall of said drilling edges along a major portion of the length of said drill body; and
   two enlarged-diameter guide faces formed on said drill body, each to extend from a slope formed at a position behind the corresponding drilling edge in the rotational direction toward the shank, the axially foremost end of each enlarged-diameter guide face being located at a position axially behind the corresponding reaming edge.

2. A high-speed burnishing drill as defined in claim 1, wherein:
   each reaming edge is connected with a respective slant face which is inclined axially backward as the respective slant face extends backward in the rotational direction.

3. A high-speed burnishing drill as defined in claim 1, wherein:

each reaming edge is connected with a respective slant face which is inclined axially forward as the respective slant face extends backward in the rotational direction.

* * * * *